Patented Feb. 12, 1952

2,584,974

UNITED STATES PATENT OFFICE 2,584,974

OPTICAL GLASS

William H. Armistead, Corning, N. Y., assignor to Corning Glass Works, Corning, N. Y., a corporation of New York No Drawing. Application May 13, 1948, Serial No. 26,930

10 Claims. (Cl. 106—53)

This invention relates to optical glasses and particularly to high refractive index glasses suitable for use in optical systems of the type known as anomalous achromats.

Anomalous achromat optical systems employ a special combination of glasses in order to correct chromatic aberration and minimize secondary spectrum. Such glasses differ as widely as possible in refractive index ($n$D) preferably at least 0.13, but must have dispersive indices or nu values ($\nu$) of at least the same order of magnitude and preferably the higher refractive index glass also has the higher nu value. This necessitates one of the glasses having both a high refractive index and a high nu value. The nu value is an inverse measure of the dispersive power of the glass, that is, the higher the nu value the lower the dispersive power.

Most optical glasses do not possess a combination of high refractive and dispersive indices. Various glass compositions containing rare earth oxides and other expensive oxides have been proposed in order to meet these optical requirements. Such prior glasses are not only excessively expensive but have an objectionable tendency to devitrify, that is, crystallize, during melting or working. They also tend to be unstable chemically and are subject to excessive weathering.

An object of my invention is to provide optical glasses which have high indices of refraction and dispersion and are suitable for use in anomalous achromat systems.

A further object is to provide such glasses free from the objectionable features of prior glasses.

The effectiveness of lonthanum oxide in raising the refractive index of glass is well known. The amount that can be used, especially in borosilicate glasses, is limited by devitrification tendencies which require the use of special melting techniques to avoid this difficulty.

The use of a few percent of BeO to stabilize such glasses has been suggested. Its use has been limited, and generally avoided because of its low solubility in the glass.

I have discovered that CaO has an unexpectedly strong solvent effect on BeO and $La_2O_3$ in borosilicate glasses. This discovery has enabled me to produce glasses containing essentially $La_2O_3$, BeO, CaO, $B_2O_3$, and $SiO_2$, that are chemically stable, resistant to devitrification and high in refractive index and nu value. Other bivalent oxides such as BaO and SrO add to the effectiveness of the CaO. Such other bivalent oxides are not substitutes for CaO since their solvent effect, even in large amounts, is relatively minor compared to that of CaO.

Broadly my invention consists in new glass compositions which contain 5–40% $SiO_2$, 5–40% $B_2O_3$, 2–15% BeO, 10–60% CaO, 5–35% $La_2O_3$, the total divalent oxides (RO) being 20–75% and the total divalent oxides plus $La_2O_3$ being 55–80%. By divalent oxides I mean oxides of the metals of the second periodic group and lead. Other oxides, if desired, may also be included in these compositions as follows: up to 60% BaO, up to 60% SrO, up to 60% CdO, up to 20% PbO, up to 30% MgO, up to 60% ZnO, up to 20% $Bi_2O_3$, up to 20% $Sb_2O_3$ and one or more of the oxides $TiO_2$, $ZrO_2$, $HfO_2$ and $ThO_2$ individually amounting to not over 11%. It is to be noted that the oxides $TiO_2$, $ZrO_2$, $HfO_2$ and $ThO_2$ constitute subgroup A or the zirconium sub-group of the fourth periodic group.

Best results are obtained with glass containing 10–25% $SiO_2$, 10–25% $B_2O_3$, 2–12% BeO, 15–30% CaO, 5–35% $La_2O_3$, up to 35% BaO, up to 35% CdO and one or more of the oxides $TiO_2$, $ZrO_2$, $HfO_2$ and $ThO_2$ individually amounting to not over 11%.

The divalent oxides BeO, CaO, BaO, CdO, SrO, PbO, ZnO, and MgO, especially BeO and CaO, are effective in raising the refractive index without appreciably lowering the nu value and a total RO content of at least 20% is necessary. Within individual limitations up to 75% may be used without danger of devitrification. At least 2% BeO is necessary for stabilization purposes. The presence of CaO in amounts greater than 10% and preferably from 15–30% permits the use of up to 15% BeO without devitrification. CaO, BaO, CdO and SrO may be used individually in amounts up to 60% without devitrification. Over 20% PbO objectionably lowers the nu value. MgO and ZnO are less effective in raising refractive index but may be used in amounts up to 30% and 60% respectively without devitrification.

$La_2O_3$ appears to enter the glass structure in the same manner as the divalent oxides and has, as previously indicated, a similar effect in raising the refractive index. At least 5% $La_2O_3$ is necessary to effectively raise the refractive index and the presence of CaO permits the use of up to 35% without devitrification. The content of divalent oxide plus $La_2O_3$ must be at least 55% to meet optical requirements and the total may be as high as 80% without devitrification.

Oxides of the elements of the zirconium subgroup of the fourth periodic group raise the refractive index and improve the chemical stability of the glass. Their solubility is increased by the presence of CaO and they may be used individually in amounts up to about 11%. $HfO_2$ and $ThO_2$ are least desirable due to cost and $TiO_2$ tends to lower the nu value.

Alumina lowers the nu value and reduces the solubility of the zirconium group oxides and is preferably omitted although it may be used as an aid in preventing crystallization.

Alkali metal oxides lower the chemical durability and except for lithia lower the nu value. Hence they should be avoided unless needed to adjust physical properties.

The oxides of antimony and bismuth have an effect similar to lead oxide and may be used in amounts up to about 20% $Sb_2O_3$ or 20% $Bi_2O_3$.

The following compositions in percent by weight as calculated from their batches illustrate but do not limit the invention:

Table

|  | I | II | III | IV | V | VI | VII | VIII | IX |
|---|---|---|---|---|---|---|---|---|---|
| $SiO_2$ | 15 | 15 | 20 | 20 | 15 | 15 | 5 | 20 | 20 |
| $B_2O_3$ | 15 | 15 | 20 | 20 | 15 | 15 | 30 | 20 | 20 |
| $La_2O_3$ | 20 | 20 | 30 | 30 | 20 | 10 | 10 | 10 | 5 |
| BeO | 5 | 5 | 5 | 5 | 5 | 5 | 7.5 | 10 | 5 |
| CaO | 20 | 20 | 20 | 20 | 20 | 20 | 15 | 40 | 50 |
| BaO | 20 |  |  |  | 10 | 20 | 10 |  |  |
| CdO |  | 20 |  |  | 10 |  |  |  |  |
| SrO |  |  |  |  |  |  | 15 |  |  |
| PbO |  |  |  |  |  | 10 |  |  |  |
| $ZrO_2$ | 5 | 5 | 5 |  | 5 | 5 | 7.5 |  |  |
| $ThO_2$ |  |  |  | 5 |  |  |  |  |  |
| RO | 45 | 45 | 25 | 25 | 45 | 55 | 47.5 | 50 | 55 |
| $RO+La_2O_3$ | 65 | 65 | 55 | 55 | 65 | 65 | 57.5 | 60 | 60 |
| nD | 1.700 | 1.726 | 1.687 | 1.681 | 1.713 | 1.702 | 1.667 | 1.658 | 1.654 |
| ν | 51.6 | 47.8 | 53.8 | 55.3 | 49.7 | 45.9 | 54.1 | 56.8 | 55.3 |

The above compositions are recited solely to illustrate the glasses within the broad limits previously set forth and the high indices of refraction and dispersion which are characteristic of these glasses. They are also characteristically resistant to chemical attack and devitrification.

Examples I to V are glasses whose optical properties and other characteristics are such as to make them especially valuable in anomalous achromat systems. These glasses are illustrative of the following range of compositions which have properties equivalent to the above glasses: $SiO_2$, 15–20%; $B_2O_3$, 15–20%; $La_2O_3$, 20–30%; BeO about 5%, CaO about 20%, about 5% of an oxide of a metal of the zirconium sub-group of the fourth periodic group, the total bivalent oxides being 25%–45%, the total bivalent oxides plus $LaO_3$ being 55–65%.

I claim:

1. A transparent optical glass having the following composition: $SiO_2$, 15%; $B_2O_3$, 15%; $La_2O_3$, 20%; BeO, 5%; CaO, 20%; CdO, 20% and $ZrO_2$, 5%.

2. A transparent optical glass comprising 5–40% $SiO_2$, 5–40% $B_2O_3$, 5–35% $La_2O_3$, and at least three divalent metal oxides in the indicated proportions selected from the group consisting of 2–15% BeO, up to 30% MgO, 10–60% CaO, up to 60% ZnO, up to 60% SrO, up to 60% CdO, up to 60% BaO and up to 20% PbO, the selected divalent metal oxides including BeO, CaO, and CdO in the above-indicated proportions, the total divalent metal oxides being between 20% and 75%, and the total divalent metal oxides plus $La_2O_3$ being between 55% and 80%.

3. A transparent optical glass comprising 5–40% $SiO_2$, 5–40% $B_2O_3$, 5–35% $La_2O_3$, up to 11% $ZrO_2$, and at least three divalent metal oxides in the indicated proportions selected from the group consisting of 2–15% BeO, up to 30% MgO, 10–60% CaO, up to 60% ZnO, up to 60% SrO, up to 60% CdO, up to 60% BaO and up to 20% PbO, the selected divalent metal oxides including BeO, CaO, and CdO in the above-indicated proportions, the total divalent metal oxides being between 20% and 75%, and the total divalent metal oxides plus $La_2O_3$ being between 55% and 80%.

4. A transparent optical glass comprising 10–25% $SiO_2$, 10–25% $B_2O_3$, 5–35% $La_2O_3$, up to 11% of an oxide selected from the group consisting of $TiO_2$, $ZrO_2$, $HfO_2$ and $ThO_2$, 2–12% BeO, 15–30% CaO, up to 35% CdO and up to 35% BaO, the total divalent metal oxides being between 20% and 75%, and the total divalent metal oxides plus $La_2O_3$ being between 55% and 80%.

5. A transparent optical glass comprising 5–40% $SiO_2$, 5–40% $B_2O_3$, 5–35% $La_2O_3$, and at least four divalent metal oxides in the indicated proportions selected from the group consisting of 2–15% BeO, up to 30% MgO, 10–60% CaO, up to 60% ZnO, up to 60% SrO, up to 60% CdO, up to 60% BaO, and up to 20% PbO, the selected divalent metal oxides including BeO, CaO, CdO, and BaO in the above-indicated proportions, the total divalent metal oxides being between 20% and 75% and the total divalent metal oxides plus $La_2O_3$ being between 55% and 80%.

6. A transparent optical glass comprising 5–40% $SiO_2$, 5–40% $B_2O_3$, 5–35% $La_2O_3$, up to 11% $ZrO_2$, and at least four divalent metal oxides in the indicated proportions selected from the group consisting of 2–15% BeO, up to 30% MgO, 10–60% CaO, up to 60% ZnO, up to 60% SrO, up to 60% CdO, up to 60% BaO, and up to 20% PbO, the selected divalent metal oxides including BeO, CaO, CdO, and BaO in the above-indicated proportions, the total divalent metal oxides being between 20% and 75%, and the total divalent metal oxides plus $La_2O_3$ being between 55% and 80%.

7. A transparent optical glass comprising 10–25% $SiO_2$, 10–25% $B_2O_3$, 5–35% $La_2O_3$, up to 11% of an oxide selected from the group consisting of $TiO_2$, $ZrO_2$, $HfO_2$ and $ThO_2$, and divalent metal oxides including 2–12% BeO, 15–30% CaO, and up to 35% CdO, the total divalent metal oxides being between 20% and 75%, and the total divalent metal oxides plus $La_2O_3$ being between 55% and 80%.

8. A transparent optical glass comprising 10–25% $SiO_2$, 10–25% $B_2O_3$, 5–35% $La_2O_3$, up to 11% $ZrO_2$, 2–12% BeO, 15–30% CaO, up to 35% CdO and up to 35% BaO, the total divalent metal oxides being between 20% and 75%, and the total divalent metal oxides plus $La_2O_3$ being between 55% and 80%.

9. A transparent optical glass comprising 15–

20% $SiO_2$, 15–20% $B_2O_3$, 20–30% $La_2O_3$, about 5% $ZrO_2$, about 5% BeO, about 20% CaO and up to 20% CdO, the total divalent metal oxides being between 25% and 45% and the total divalent metal oxides plus $La_2O_3$ being between 55% and 65%.

10. A transparent optical glass comprising 15–20% $SiO_2$, 15–20% $B_2O_3$, 20–30% $La_2O_3$, about 5% $ZrO_2$, about 5% BeO, about 20% CaO, up to 20% CdO and up to 20% BaO, the total divalent metal oxides being between 25% and 45% and the total divalent metal oxides plus $La_2O_3$ being between 55% and 65%.

WILLIAM H. ARMISTEAD.

REFERENCES CITED

The following references are of record in the file of this patent:

UNITED STATES PATENTS

| Number | Name | Date |
|---|---|---|
| 2,297,453 | Berger et al. | Sept. 29, 1942 |
| 2,406,580 | Bastick et al. | Aug. 27, 1946 |